United States Patent [19]

Adams

[11] 4,337,275
[45] Jun. 29, 1982

[54] MEAT PRODUCT AND PROCESS OF PREPARATION

[75] Inventor: Edward G. Adams, Paoli, Pa.

[73] Assignee: Keystone Foods Corporation, Folcroft, Pa.

[21] Appl. No.: 183,853

[22] Filed: Sep. 3, 1980

[51] Int. Cl.³ ............................ A23L 1/31; A23P 1/00
[52] U.S. Cl. .................................... 426/104; 426/144; 426/249; 426/383; 426/513; 426/646
[58] Field of Search ............... 426/104, 144, 249, 641, 426/646, 383, 513, 518, 523, 524; 17/32; 425/408; 99/372, 376, 388, 430, 439

[56] References Cited

U.S. PATENT DOCUMENTS

| | | | |
|---|---|---|---|
| 2,246,719 | 6/1941 | Burnham | 99/388 X |
| 2,274,250 | 2/1942 | Simpkins | 426/513 |
| 2,670,296 | 2/1954 | Tansley | 426/513 |
| 2,771,366 | 11/1956 | Shadid | 426/388 |
| 2,798,814 | 7/1957 | Rivoche | 426/646 X |
| 2,806,247 | 9/1957 | Shadid | 17/32 |
| 2,827,659 | 3/1958 | Rabun | 17/32 |
| 3,863,020 | 1/1975 | Robinson | 426/513 |
| 3,934,050 | 1/1976 | Hawkins | 426/646 X |
| 4,026,201 | 5/1977 | Fetzer | 99/388 X |
| 4,235,941 | 11/1980 | Coats | 426/104 X |

FOREIGN PATENT DOCUMENTS 2847286  5/1979  Fed. Rep. of Germany ...... 426/513

*Primary Examiner*—Arthur L. Corbin
*Attorney, Agent, or Firm*—Weiser, Stapler & Spivak

[57] ABSTRACT

An improved meat product is disclosed, which comprises a slab of ground meat, shaped to resemble a steak. On both sides of the slab is a set of grooves. The grooves on a particular side are parallel to each other, but the grooves on one side are oriented in a different direction from that of the grooves on the other side. This arrangement assures that the meat particles, before cooking, will be intertwined, thereby improving the similarity in texture to an actual steak. After cooking, the meat product will have parallel darkened bands on its two sides, thereby enhancing its visual similarity to a charcoal-broiled steak.

16 Claims, 3 Drawing Figures

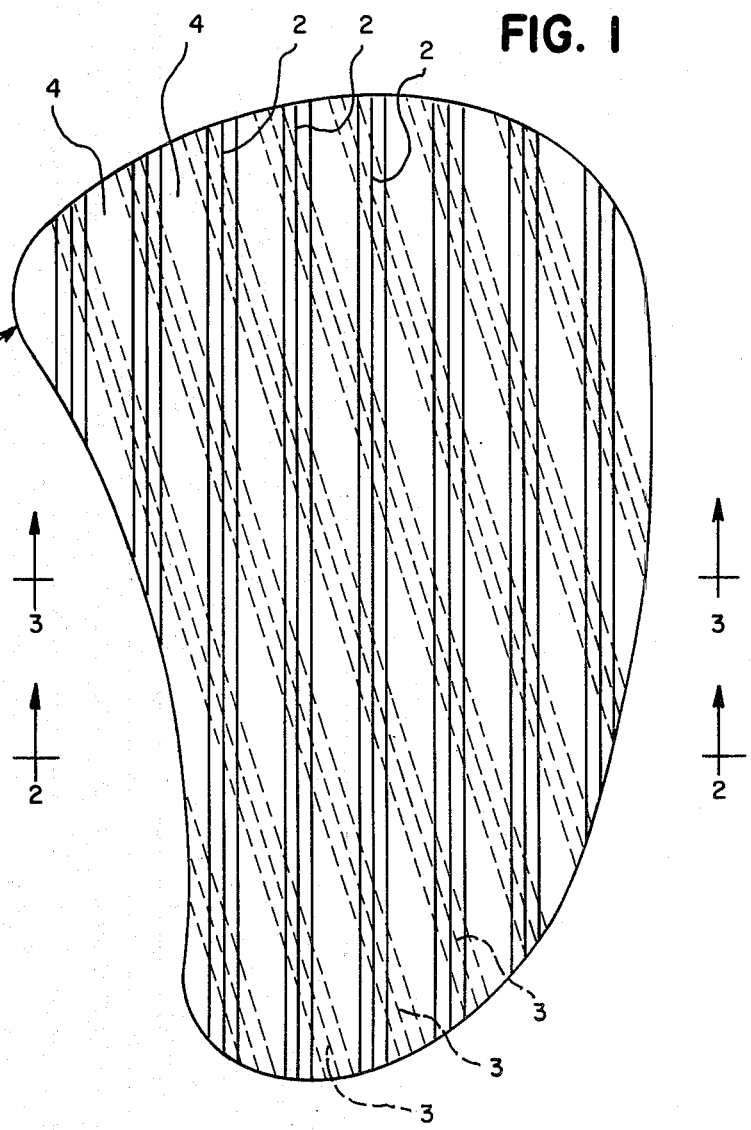

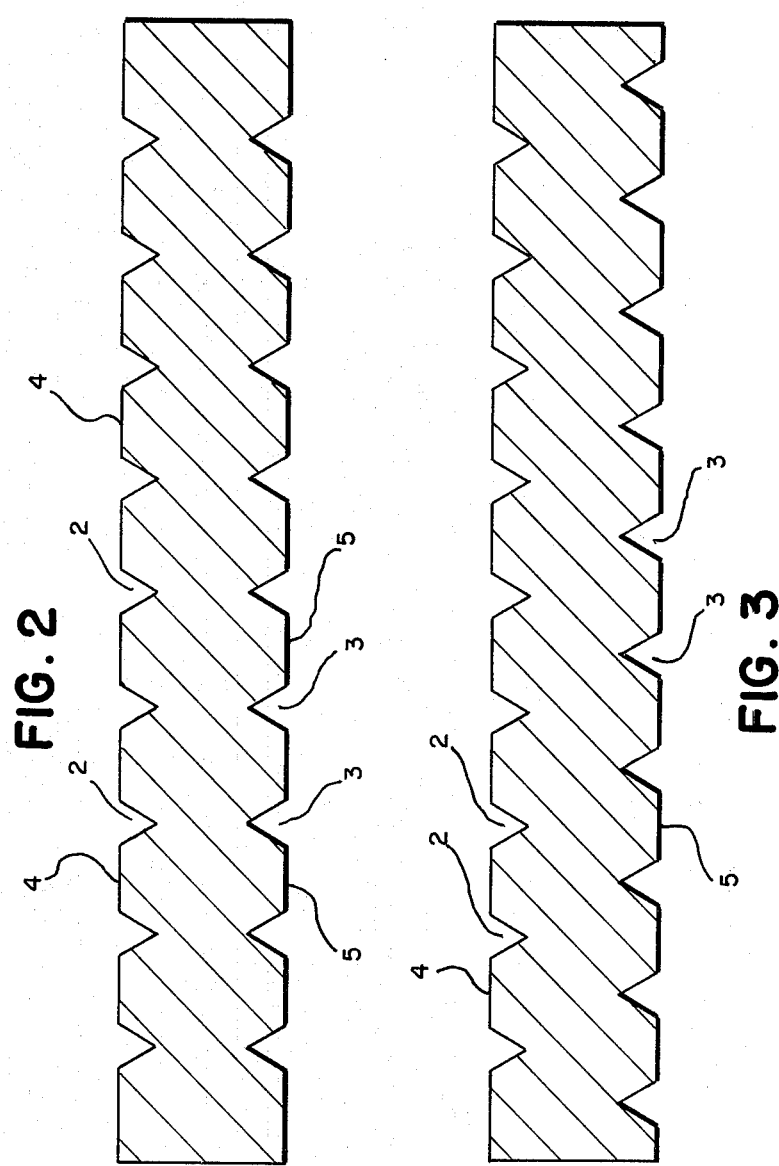

MEAT PRODUCT AND PROCESS OF PREPARATION

BACKGROUND OF THE INVENTION

This invention deals with an improved meat product, wherein a slab of ground meat particles can be prepared so as to resemble a charcoal-broiled steak. The present invention is an improvement over a prior invention, which is the subject of U.S. patent application Ser. No. 847,674, filed Nov. 1, 1977, now U.S. Pat. No. 4,235,941, which is co-pending with the present application, and which is assigned to the assignee of this invention. The prior application is incorporated by reference herein.

The meat product described in the prior application comprises a slab of ground meat having a plurality of spaced-apart grooves extending transversely across one or both sides of the slab. When the slab is placed on a cooking surface, the lands defining the grooves are cooked more intensely, while the remainder of the slab receives less heat. Because the lands have been cooked longer, the finished meat product contains a series of parallel darkened strips, positioned where the lands originally were. This product therefore resembles a natural charcoal-broiled steak, which had been cooked over a charcoal fire while resting on a grid of supporting rods.

Because a meat product of the type described above is ideally suited for use as a convenience food, it is important that the user be able to cook the product quickly, and that the cooking be accomplished evenly over the entire length of the "steak". It is also important to prevent the loss of natural juices, which occurs because of the tendency of the meat product to curl while being cooked, allowing the juices to run off.

It is desired that a meat product of the type described resemble more closely an actual charcoal-broiled steak. This goal and others to be apparent from the following description are accomplished by the present invention.

SUMMARY OF THE INVENTION

The present invention comprises a slab of frozen, compacted ground meat having a plurality of substantially parallel grooves on both sides of the slab. The grooves are preferably positioned to extend along the length of the slab. The grooves on one surface of the slab are disposed in a different direction from the grooves on the other surface. The grooves on both surfaces of the slab are produced by placing the slab in a mold, and applying pressure to both surfaces. The grooves are impressed on the slab because the meat cannot escape confinement by the mold. The pressure from the mold causes the meat fibers in the slab to become intertwined, especially at those regions where the grooves of one surface intersect the grooves of the other surface.

The grooves on both sides of the slab are disposed to extend along the length of the slab, rather than across its width, because this arrangement causes the slab to retain more of its natural juices while cooking, in contrast to the run-off experienced when the grooves are disposed transversely.

The use of intersecting grooves, as described, improves the heat penetration characteristics of the slab, and allows the meat product to be cooked more rapidly, due to the reduced thickness of the meat in the regions of intersection. Since it can be rapidly cooked, the meat product is thus especially suitable for use in a fast-food environment.

Accordingly, it is an object of the present invention to provide an improved meat product, composed of frozen, compacted ground meat, which, when cooked, resembles a charcoal-broiled steak, both in texture and appearance.

It is a further object of the present invention to provide a meat product as described above, which allows heat from a cooking utensil to penetrate rapidly and evenly through the meat product.

It is a further object of the present invention to provide a meat product, as described above, wherein the ability of the meat product to retain its natural juices during cooking is enhanced.

It is a further object of the present invention to provide a meat product, made of ground meat particles, wherein the texture of the meat product is made to resemble that of a charcoal-broiled steak, by virtue of the intertwining of meat fibers caused by pressure applied while the meat is in its frozen state.

It is a further object of the present invention to provide a method of preparing a ground meat product, such that the cooked product resembles, in appearance and texture, a charcoal-broiled steak.

Other objects and advantages of the present invention will be apparent to those skilled in the art, from a reading of the following brief description of the drawings, the detailed description of the invention, and the appended claims.

BRIEF DESCRIPTION OF THE DRAWINGS

FIG. 1 is a plan view of a meat product constructed according to the present invention.

FIG. 2 is a cross-sectional view taken along the line 2—2 of FIG. 1.

FIG. 3 is a cross-sectional view taken along the line 3—3 of FIG. 1.

DETAILED DESCRIPTION OF THE INVENTION

The improved meat product of the present invention is illustrated in the plan view of FIG. 1. The meat product, indicated generally by reference numeral 1, is shaped in the form of a steak, being generally oval but wider at one end than the other. The narrower end is also known as the "tail" of the steak. Impressed into the top side of meat product or slab 1 are a plurality of substantially parallel grooves 2, and impressed into the bottom side (hidden from view in FIG. 1) are grooves 3 of similar construction.

Grooves 2 and 3 comprise indentations, defined by pairs of inclined surfaces, as illustrated in the cross-sectional views of FIGS. 2 and 3. Between grooves 2 are lands 4, and between grooves 3 are lands 5. The lands are substantially flat, and in the preferred embodiment are about one-half of an inch in width.

FIG. 2 is taken along the line 2—2 of FIG. 1, and shows a portion of the slab where the grooves 2 and 3 intersect. FIG. 3, taken along the line 3—3 of FIG. 1, shows a portion of the slab where the grooves 2 and 3 do not intersect.

It is preferred that the grooves 2 and 3 be disposed along the longitudinal dimension of the meat product 1. As is seen in FIG. 1, most of the grooves extend along most or all of the longest dimension of meat product 1.

Of course, not all grooves can extend the same length, due to the particular shape of the meat product.

As stated in the prior application, Ser. No. 847,674, it is desirable that the meat product consist of fibrous, and not granular, particles in order to optimize its steak-like consistency. A meat product made according to the present invention has a consistency which is further enhanced, because the pressure applied to the frozen slab, to form the intersecting grooves on both sides of the slab, causes the meat fibers to become intertwined. This intertwining adds to the textural similarity to a steak. Furthermore, the intersecting grooves allow for faster heat penetration by reason of the reduced thickness in the regions of the intersections.

The grooves 2 and 3 are formed while the meat is in a semi-frozen state. It has been found that the optimum temperature for forming grooves is 28° F. Below this temperature, the meat fibers tend to fracture. The meat slab 1 is placed within dies, or other conventional mold defining means, and is compressed so as to impress the grooves onto the slab. During this process, the meat fibers intertwine in the regions of intersection, as discussed above.

One problem encountered in the use of this meat product is non-uniformity of cooking. In general the tail of the steak tends to cook faster than the wide portion. Although it has been found that uniformity of cooking is best achieved when the grooves on either side of the slab are non-intersecting, it is nevertheless desirable for the grooves to intersect, to promote intertwining, as discussed above. For purposes of intertwining, though, the angle of intersection of the grooves is not critical, as long as they do intersect. It turns out that the configuration shown in the figures represents a good compromise between the need for uniformity of cooking and intertwining of fibers.

It has also been found that the longitudinal disposition of grooves 2 and 3 helps the meat product 1 to retain more of its natural juices, as compared to a meat product having transverse grooves (as described in the prior application). When cooked, a meat product of the type described tends to curl up, with the edges, but not the interior, touching the cooking surface. If the grooves are transverse, there is a tendency for juice to run off. With longitudinal grooves, there is less run-off, because the meat product is flat over a greater fraction of the length of each groove.

As in the prior application, the cooked meat product resembles a charcoal-broiled steak having a series of parallel darkened bands. Meat product 1 is placed on a conventional cooking plate (not shown), and heat from a conventional source is applied initially along the lands 4 or 5, depending on which side is first placed on the plate. The lands, because they are in contact with the cooking plate, are cooked much more intensely than the grooves. Thus, the areas corresponding to the lands are darkened in the finished product.

After one side of meat product 1 has been cooked as described, the meat product is turned over and cooked on its other side in the same manner. Therefore, the final product has parallel darkened bands on both major surfaces.

Although the invention has been described with respect to the embodiment illustrated in the figures, it is understood that other variations are included within the scope of the claims. For example, the precise shape of the grooves can vary. The temperatures and times used for cooking may be as taught in the prior application, or may be varied to suit individual taste. Other variations in the structure, disposition, and spacing of the grooves are possible, all within the scope of the claims.

What is claimed is:

1. A slab of frozen, compacted, meat particles having a first plurality of substantially parallel grooves on one side of the slab, and having a second plurality of substantially parallel grooves on the opposite side of the slab, the second plurality of grooves being oriented in a direction different from that of the first plurality of grooves.

2. The slab of claim 1, wherein the first and second pluralities of grooves are defined by pairs of inclined surfaces, the inclined surfaces comprising indentations in the slab.

3. The slab of claim 2, wherein the slab is shaped to resemble a charcoal-broiled steak, the slab being longer than it is wide, and wherein the first plurality of grooves extend generally along the length of the slab.

4. The slab of claim 3, wherein the second plurality of grooves extend generally along the length of the slab.

5. The slab of claim 4, wherein the meat fibers of the slab are interwined in the vicinity of the points of intersection of the grooves on either side of the slab, by virtue of the slab having been placed in a mold and pressure to form the grooves having been applied to both surfaces of the slab.

6. The slab of claim 5, wherein the first and second pluralities of grooves are disposed in substantially parallel planes.

7. A method of preparing a meat product comprising a slab of frozen, compacted, meat particles having a first plurality of substantially parallel grooves on one side of the slab, and having a second plurality of substantially parallel grooves on the opposite side of the slab, the second plurality of grooves being oriented in a direction different from that of the first plurality of grooves, comprising the steps of:
   placing the slab upon a heated cooking plate, and
   subjecting the slab so placed to the heat from the plate
   until the portions of the surface between the grooves have darkened to a more pronounced degree than the grooves.

8. The method of claim 7, further comprising turning the slab over on the cooking plate, and subjecting the other side of the slab to the heat from the cooking plate, until the portions of the surface between the grooves have darkened to a more pronounced degree than the grooves.

9. The meat product produced by the process of claim 7 or 8.

10. A method of making a frozen meat slab shaped to resemble a steak, having substantially parallel grooves on both major surfaces of the slab, the grooves in either surface being disposed in different directions, the slab being adapted to be cooked so as to resemble a charcoal-broiled steak, comprising the steps of:
   forming the meat slab from particles of meat,
   lowering the temperature of the slab to about 28° F.,
   confining the slab within pressure applying means, and then
   impressing a pair of sets of parallel grooves onto the slab, the set of grooves on one major surface of the slab being non-parallel to the set of grooves on the other major surface of the slab.

11. The method of claim 10 wherein the impressing step comprises intertwining the meat fibers in the regions of intersection of the sets of grooves, by virtue of pressure being applied to both surfaces of the slab in impressing the grooves during confinement.

12. The method of claim 10, wherein the grooves are impressed substantially along the length of the slab.

13. The slab produced according to claim 10 or 11.

14. A method of preparing a meat product which comprises ground meat particles, and which resembles a charcoal-broiled steak in texture and appearance, comprising the steps of:

placing a slab of ground meat within a steak-shaped mold, impressing a pair of sets of parallel grooves on either surface of the slab, the grooves on one surface of the slab being oriented in a direction different from that of the grooves on the other surface of the slab, setting the slab upon a cooking surface, and then applying heat, first to one surface of the slab and then to the other surface of the slab.

15. The method of claim 14, wherein the slab is frozen prior to the placing step.

16. The method of claim 15, wherein the slab is frozen to a temperature of about 28° F.

* * * * *